United States Patent
Lukic et al.

(10) Patent No.: US 8,869,411 B2
(45) Date of Patent: Oct. 28, 2014

(54) ROTATING LASER DEVICE HAVING AN INCLINED LASER PLANE AND A METHOD FOR ALIGNING A ROTATING LASER DEVICE

(75) Inventors: Sasha Lukic, Buchs (CH); Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 221 days.

(21) Appl. No.: 13/300,339

(22) Filed: Nov. 18, 2011

(65) Prior Publication Data

US 2012/0124851 A1    May 24, 2012

(30) Foreign Application Priority Data

Nov. 22, 2010 (DE) .......................... 10 2010 061 725

(51) Int. Cl.
*G01C 15/00* (2006.01)
(52) U.S. Cl.
CPC .................................. *G01C 15/004* (2013.01)
USPC .............................................. 33/228; 33/286
(58) Field of Classification Search
USPC ............................ 33/228, 286, 290, DIG. 21
See application file for complete search history.

(56) References Cited

U.S. PATENT DOCUMENTS

| | | | |
|---|---|---|---|
| 5,055,666 A * | 10/1991 | Miyahara ................... | 250/206.1 |
| 5,402,223 A | 3/1995 | Schlobohm et al. | |
| 5,751,408 A * | 5/1998 | Ohtomo et al. .............. | 356/5.14 |
| 6,171,018 B1 * | 1/2001 | Ohtomo et al. .............. | 404/84.5 |
| 6,563,574 B2 * | 5/2003 | Ohtomo et al. ............ | 356/141.1 |
| 7,127,822 B2 * | 10/2006 | Kumagai et al. ................ | 33/290 |
| 2003/0136901 A1 | 7/2003 | Ohtomo et al. | |
| 2005/0274879 A1 | 12/2005 | Osaragi et al. | |
| 2008/0304041 A1 | 12/2008 | Ohtomo et al. | |
| 2010/0064534 A1 | 3/2010 | Schumacher et al. | |
| 2012/0124851 A1 * | 5/2012 | Lukic et al. .................... | 33/228 |
| 2012/0127553 A1 * | 5/2012 | Lukic et al. .................. | 33/1 PT |
| 2012/0203502 A1 * | 8/2012 | Hayes et al. .................... | 33/280 |

FOREIGN PATENT DOCUMENTS

| | | |
|---|---|---|
| DE | 43 24 478 A1 | 1/1995 |
| DE | 103 01 971 A1 | 9/2003 |
| EP | 0 722 080 A1 | 7/1996 |
| EP | 1 001 251 A1 | 5/2000 |
| EP | 2 053 353 A1 | 4/2009 |
| EP | 2 144 037 A1 | 1/2010 |
| EP | 2 410 292 A2 | 1/2012 |
| EP | 2 551 637 A1 | 1/2013 |

OTHER PUBLICATIONS

U.S. Appl. No. 12/536,433, "Rotary Construction Laser", filed Aug. 5, 2009, Inventor Barth Stefan, et al.

(Continued)

*Primary Examiner* — Yaritza Guadalupe-McCall
(74) *Attorney, Agent, or Firm* — Crowell & Moring LLP

(57) ABSTRACT

A rotating laser device and method is disclosed. The laser device includes a laser unit, which generates a laser beam, a leveling device, which aligns the laser beam in a horizontal plane which is arranged perpendicular to the gravitational field of the earth, an inclination device, which inclines the laser beam about an axis of inclination in relation to the horizontal plane, a rotational unit which moves the laser unit at least partially about an axis of rotation at a rotational speed, and a measuring unit with which an angle of rotation of the laser unit about the axis of rotation can be determined such that a memory unit is provided for storing at least one angular position.

16 Claims, 7 Drawing Sheets

(56) References Cited

OTHER PUBLICATIONS

U.S. Appl. No. 12/536,441, "Rotary Construction Laser With Stepper Motor", filed Aug. 5, 2009, Inventor Sasha Lukic, et al.
U.S. Appl. No. 12/536,430, "Laser Instrument", filed Aug. 5, 2009, Inventor Barth Stefan, et al.
U.S. Appl. No. 12/770,480, "Holding Device for Fastening a Laser Instrument", filed Apr. 29, 2010, Inventor Roman Steffen.
U.S. Appl. No. 12/770,495, "Holding Device for Fastening a Laser Instrument", filed Apr. 29, 2010, Inventor Roman Steffen, et al.
U.S. Appl. No. 12/790,705, "Laser Instrument for Electro-Optical Distance Measurement", filed May 28, 2010, Inventor Torsten Gogolla, et al.
U.S. Appl. No. 12/790,693, "Laser Instrument for Electro-Optical Distance Measurement", filed May 28, 2010, Inventor Torsten Gogolla, et al.
U.S. Appl. No. 13/186,701, "Laser Instrument and Method for Adjusting the Laser Power", filed Jul. 20, 2011, Inventor Andreas Winter, et al.
U.S. Patent Application, "Rotary Laser Device and Method for Controlling a Laser Beam", filed Nov. 18, 2011, Inventor Sasha Lukic, et al.
German Office Action dated Sep. 30, 2013 (Six (6) pages).
European Search Report dated May 30, 2014, with Statement of Relevancy (Twelve (12) pages).

* cited by examiner

ROTATING LASER DEVICE HAVING AN INCLINED LASER PLANE AND A METHOD FOR ALIGNING A ROTATING LASER DEVICE

This application claims the priority of German Patent Document No. 10 2010 061 725.3, filed Nov. 22, 2010, the disclosure of which is expressly incorporated by reference herein.

BACKGROUND AND SUMMARY OF THE INVENTION

The present invention relates to a rotating laser device having an inclined laser plane. The invention also relates to a method for aligning a rotating laser device.

In order to perform leveling or marking jobs in interior and exterior areas, there are known rotating laser devices, which create limited or closed linear laser markings on a target surface. The tasks of the rotating laser devices include display of laser markings running horizontally or obliquely on a target surface.

Known rotating laser devices comprise a laser unit, which generates a laser beam, a rotational unit, which moves the laser unit at least partially about an axis of rotation at a rotational speed and a measuring unit with which the angle of rotation of the laser unit about the axis of rotation can be determined. Furthermore, known rotating laser devices have a leveling device, which aligns the laser plane in which the laser beam is rotated about the axis of rotation, independently of the housing alignment of the rotating laser device, to be parallel to a horizontal plane. The horizontal plane is aligned to be perpendicular to the gravitational field of the earth and is spanned by two axes running perpendicular to one another and known as the X axis and the Y axis. The leveling device comprises a first leveling unit for the X axis and a second leveling unit for the Y axis, such that the first and second leveling units each comprise a sensor device for monitoring the inclination and an adjusting device for adjusting the inclination.

To display oblique laser markings on a target surface, rotating laser devices have an inclination device with which the laser plane is inclined about an angle of inclination in a targeted manner in comparison with the aligned horizontal plane. These oblique laser markings are required in displaying a skewed plane, for example. It is important here that the laser plane is inclined in only one direction, which is referred to as the direction of inclination, and is still aligned horizontally in the direction, which is perpendicular to the angle of direction and is referred to as the horizontal direction. There are known inclination devices, which incline the laser plane about the X axis or about the Y axis. Inclination devices which incline the laser plane about the X axis as the axis of inclination are considered below, where the discussions can be applied similarly to inclination devices with which the laser plane is inclined about the Y axis. Rotating laser devices having an inclination device, which inclines the laser plane about the X axis and about the Y axis, are provided for other applications.

The inclination is adjusted in the leveled state of the rotating laser device, in which the laser beam is arranged in the horizontal plane. The alignment of the direction of inclination and that of the horizontal direction are defined by the measurement task, and the direction of inclination is aligned parallel to an X' axis, which is displayed on the rotating laser device. In the ideal case, i.e., without any deviations in dimension between the components of the rotating laser device, the X axis, which is embodied as the axis of inclination, and the X' axis, which is displayed on the rotating laser device, are parallel to one another, and the Y axis is arranged perpendicular to the displayed X' axis and/or perpendicular to the direction of inclination. If the direction of inclination and/or the displayed X' axis are arranged parallel to the axis of inclination (X axis) and perpendicular to the Y axis, then an inclination about the axis of inclination will not lead to an adjustment of the leveled horizontal position in the Y' direction. Deviations in dimension between the various components of the rotating laser device lead to a rotation between the X axis and the X' axis displayed on the rotating laser device and between the Y axis and the Y' axis. If the direction of inclination is not arranged perpendicular to the Y axis, the inclination about the X axis leads to an adjustment of the leveled horizontal position in the Y' direction, i.e., the horizontal direction deviates from the horizontal plane.

If the rotating laser device is rotated about the axis of rotation, there is an angular position in which the direction of inclination is aligned parallel to the X axis, which is embodied as the axis of inclination and perpendicular to the Y axis. Methods for manually aligning a rotating laser device which must be performed by an operator before any new measurement task of the rotating laser device with an inclined laser plane are known. The goal of these methods is to align the rotating laser device, so that the direction of inclination runs perpendicular to the Y axis. This position is determined by the operator in iterative steps. The operator has found the position being sought when a sensor device does not detect any adjustment out of the leveled horizontal position in Y' direction with an inclination about the axis of inclination. It is a disadvantage that the known methods for aligning a rotating laser device are complex for the operator, so that the alignment is not always performed.

It would be desirable to improve upon the rotating laser device with regard to the disadvantages mentioned above. The object of the present invention is to reduce the complexity for aligning the rotating laser device for the operator and to increase the precision of the laser markings created by the rotating laser device on a target surface.

According to the invention, a memory unit is provided with the rotating laser device for storing at least one angular position. Due to the memory unit, there is the option of storing the angular position in which the direction of inclination is parallel to the X axis, which corresponds to the axis of inclination, and perpendicular to the Y axis, and there is the option of retrieving this angular position as needed, i.e., before a new measurement task. The effort for aligning the rotating laser device is reduced because the angular position need not be determined by the operator in a complicated procedure, but instead the rotating laser device need only be rotated into the angular position as needed.

A control unit, which adjusts at least one beam property of the laser beam as a function of the angle of rotation, is preferably provided. Suitable beam properties of the laser beam include in particular the laser power and, in the case of a modulated laser beam, the optical frequency and/or the amplitude. Due to the change in at least one beam property of the laser beam, there is the possibility of visually displaying the angular position for the operator.

In a preferred embodiment, the memory unit is embodied as a mechanical memory unit and is arranged in the form of at least one reference element on a master disk of the measuring device. The measuring device comprises a master disk which is connected to the rotational unit in a rotationally fixed manner, a scanning unit for scanning the master disk and a control and evaluation unit. The master disk is fixedly connected to a rotating shaft or is connected in a rotationally fixed manner by gear wheels or toothed belts. A fixedly attached master disk has the advantage that the measurement of the angle of rotation is stable with respect to external influences, in particular temperature. The resolution of the angle of rotation can be increased by adding a gear ratio as an intermediary function. A mechanical memory unit has the advantage that no additional component is necessary for the memory unit, and detection of the angular position is stable with respect to external influences.

In an alternative preferred embodiment, the memory unit is embodied as an electronic memory unit, such that the memory unit is especially preferably connected to an input device. An electronic memory unit has the advantage over a mechanical memory unit that the angular position in which the direction of inclination is aligned parallel to the X axis and perpendicular to the Y axis can be stored subsequently, so that rotating laser devices can be upgraded. Furthermore, there is the option of adapting the angular position to changing ambient conditions, if necessary. At the time of a repair or service on the rotating laser device, the manufacturer can check on whether the leveling axes and the axes of inclination are aligned as desired in the stored angular position. If this is not the case, the modified angular position can be determined by the manufacturer using measurement technology and stored in the electronic memory unit as a new angular position.

A display unit having a first display element and a second display element is preferably provided. The first display element is especially preferably embodied as a left arrow, and the second display element is embodied as a right arrow. The display unit has the advantage that adjustment instructions for the operator may be displayed by the display elements. A third display element, which indicates to the operator that the rotating laser device is arranged in the desired angular position, is especially preferred.

An automatic adjusting device is preferably provided, so that the rotating laser device is adjustable about the axis of rotation. This has the advantage that the alignment of the rotating laser device can be performed fully automatically and the effort for the operator is minimized.

A laser receiver is preferably provided, such that the laser receiver can be connected to the rotating laser device by a communication link, and the laser receiver is designed to determine at least one beam property of the laser beam and/or an interval of time of the laser beam. Through the combination of the rotating laser device with a laser receiver, there is the possibility of transmitting information about the laser beam to the rotating laser device.

According to the invention, in a method for aligning a rotating laser device, the angular position in which the axis of inclination is aligned parallel to a predetermined direction of inclination is stored in a memory unit. This method has the advantage that the angular position is already known and the rotating laser device need only be rotated into the corresponding angular position. The effort for the operator in aligning the rotating laser device is thereby reduced in that the operator need not first determine the angular position in a complicated procedure. The angular position need only be determined once in a complicated procedure and can then be used at any time to align the rotating laser device.

The laser beam is preferably moved about the axis of rotation at a rotational speed, an angle of rotation of the laser beam about the axis of rotation is detected by a measuring unit and at least one beam property of the laser beam is adjusted as a function of the angle of rotation. Due to the possibility of controlling the rotating laser beam, the stored angular position can be displayed visually on a target surface based on a changing beam property of the laser beam.

In a preferred variant, the at least one beam property of the laser beam is changed from a first value to a second value on reaching the angular position, and is changed from the second value to the first value on reaching the zero position. The operator recognizes the angular position as the position at which the laser beam changes its beam property. Due to the possibility of controlling the rotating laser beam, the stored angular position may be displayed visually on a target surface based on a changing beam property of the laser beam. The optical frequency of the laser beam is most especially suitable for doing this. Various optical frequencies may be generated by modulation of the laser beam at various modulation frequencies, for example. The beam property used may be any property of the laser beam, which is readily visible optically for the operator or can be detected with the help of a laser receiver.

In another preferred variant, a first angle of rotation, which is smaller than the angular position, and a second angle of rotation, which is larger than the angular position, are calculated from the at least one stored angular position, and at least one beam property of the laser beam is controlled as a function of the angle of rotation, such that the at least one beam property of the laser beam is altered from a first value to a second value on reaching the first angle of rotation, is altered from the second value to a third value on reaching the second angle of rotation, and is altered from the third value to the first value on reaching the zero position. This method has the advantage that the operator can recognize visually whether the rotating laser device is aligned, and if this is not the case, the operator can recognize whether a right rotation or a left rotation of the rotating laser device about the axis of rotation is necessary.

In an alternative preferred method, the laser unit is moved back and forth about the axis of rotation between a first and a second turning point by the rotational unit. In this scanning mode, the rotating laser device is aligned in the desired angular position when the midpoint of the limited laser line coincides with the direction of inclination of the rotating laser device.

The laser beam is preferably detected by a laser receiver and the at least one beam property of the laser beam and/or an interval of time is determined by the laser receiver. Adjustment instructions for the operator are preferably determined from the at least one beam property of the laser beam, such that the adjustment instructions are displayed on a display unit. Due to the fact that the laser receiver detects the at least one beam property of the laser beam that has been altered, the effort for the operator is further reduced. The operator receives simple adjustment instructions.

In an alternative preferred method, the at least one stored angular position is transmitted to an automatic adjustment device, and the rotating laser device is rotated by the adjustment device about the axis of rotation into the stored angular position. This variant of the method has the advantage that the alignment of the rotating laser device is performed fully automatically and the effort for aligning the rotating laser device for the operator is minimal.

Exemplary embodiments of the invention are described below with reference to the drawings. These drawings do not necessarily represent exemplary embodiments drawn to scale; instead, the drawings are in a schematic and/or slightly distorted form, where this serves the purpose of explanation. Reference is made to the relevant prior art with regard to supplements to the teachings directly discernible from the drawings. It should be pointed out that a variety of modifications and changes pertaining to the shape and details of an embodiment can be made without deviating from the general idea of the invention. The features of the invention disclosed in the description, the drawings and the claims may be essential by themselves individually and also in any combination for the further embodiment of the invention. Furthermore, all combinations of at least two of the features disclosed in the description, the drawings and/or the claims fall within the scope of the invention. The general idea of the invention is not limited to the precise form or the details of the preferred embodiment shown and described below, nor is it limited to an object that would be restricted in comparison with the object claimed in the claims. With given dimension ranges, values within the aforementioned limits should also be disclosed as limit values and may be used and claimed at will. For the sake of simplicity, the same reference numerals are used below for identical or similar parts or for parts with an identical or similar function.

DETAILED DESCRIPTION OF THE DRAWINGS

Figure 1:
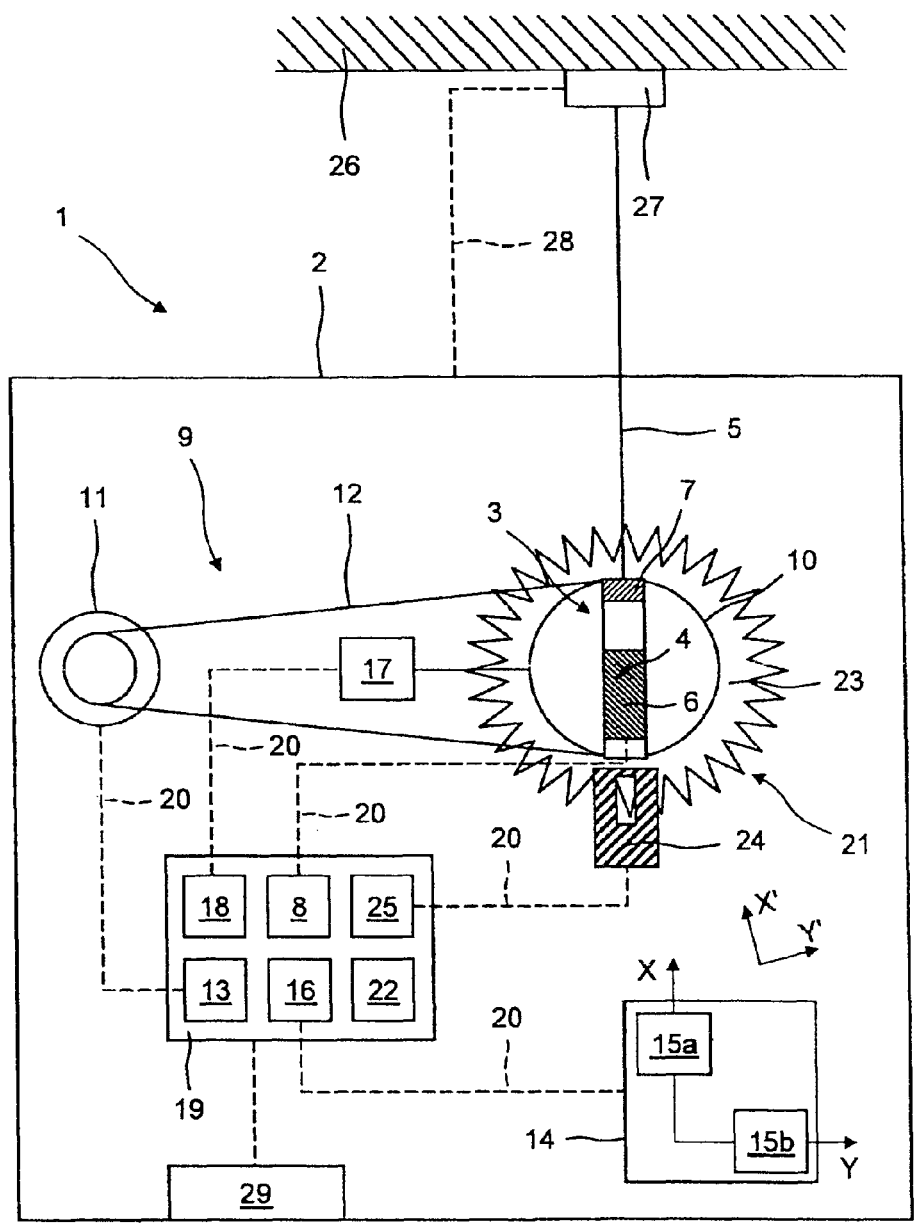
FIG. 1 shows a rotating laser device according to the invention with a measuring unit for detecting an angle of rotation and a memory unit for storing an angular position.

FIG. 1 shows in a schematic diagram a laser unit 1 according to the invention, which is embodied as a rotating laser device. The rotating laser device 1 comprises a housing 2 and a laser unit 3 arranged in the housing 2 and designed to rotate about an axis of rotation 4.

The laser unit 3 generates a laser beam 5 and comprises a beam source 6 and an optical element 7 for shaping the laser beam, this element being known as the beam shaping optics. The beam source 6 is embodied as a semiconductor laser which generates a laser beam 5 in the visible spectrum, for example, a red laser beam with a wavelength of 635 nm or a green laser beam with a wavelength of 532 nm. After the laser beam 5 emerges from the beam source 6, the laser beam 5 is collimated with the help of the beam shaping optics 7 and a parallel laser beam is generated. The beam source 6 is controlled by a first control unit 8.

The laser unit 3 is connected to a rotational unit 9, which moves the laser unit 3 at a rotational speed about the axis of rotation 4, such that the rotational speed may be constant but also variable. The rotational unit 9 comprises a rotatable shaft 10, a motor unit 11 and a transmission unit 12, which is embodied in the form of a toothed belt and transmits the movement of the motor unit 11 to the shaft 10. The laser unit 3 is coupled to the rotatable shaft 10 and can be rotated about the axis of rotation 4. The rotational unit 9 is controlled by a second control unit 13.

In the embodiment according to FIG. 1, the beam source 6 and beam shaping optics 7 are moved about the axis of rotation 4 by the rotational unit 9. In an alternative embodiment, the laser unit 3 additionally comprises an optical element for deflection of the laser beam; this is known as the deflection optics. The beam source 6 generates a laser beam, which is directed at the deflection optics. The shaft 10 is connected to the deflection optics, which is moved by the rotational unit 9 about the axis of rotation 4. The beam shaping optics 7 may be arranged between the beam source 6 and the deflecting optics. Furthermore, the beam shaping optics 7 may be integrated into the beam source 6 or may be omitted entirely in the case of a beam source 6 having a high beam quality and low divergence. In any case, at least one component of the laser unit 3 is moved by the rotational unit 9 about the axis of rotation 4.

The rotating laser device 1 has a leveling device 14, with which the laser beam 5 runs in a horizontal plane aligned at a right angle to the gravitational field of the earth, regardless of the alignment of the housing 2. The horizontal plane is spanned by two leveling axes, which are known as the X axis and the Y axis and are perpendicular to one another. The leveling unit 14 comprises a first leveling unit 15a for the X axis and a second leveling unit 15b for the Y axis. The leveling units 15a, 15b each comprise a sensor device and an adjusting device. The leveling unit 14 is controlled by a third control unit 16.

The laser plane through which the laser beam passes may be inclined by an angle of inclination with respect to the horizontal plane. To do so, the shaft 10 is designed to be adjustable by an inclination device 17 for adjusting the angle of inclination about the X axis, which is also referred to as the inclination axis. An inclined laser plane is inclined in the direction of the X axis (X direction) and is aligned horizontally in the direction of the Y axis (Y direction). The inclination device 17 is controlled by a fourth control unit 18.

The leveling axes X, Y are displayed by display elements X', Y' on the rotating laser device 1. In the ideal case, i.e., without any deviations in dimension between the components of the rotating laser device 1, the X axis and/or the Y axis and the X' axis and/or the Y' axis, which are displayed on the rotating laser device 1, run parallel to one another. Deviations in dimensions of the various components of the rotating laser device 1 result in twisting between the X axis and the X' axis and between the Y axis and the Y' axis. The measurement task determines the alignment of the direction of inclination and the horizontal direction. The rotating laser device 1 is arranged so that the direction of inclination runs parallel to the X' axis, and the horizontal direction runs parallel to the Y' axis.

The first control unit 8 for controlling the laser unit 3, the second control unit 13 for controlling the rotational device 9, the third control unit 16 for controlling the leveling device 14 and the fourth control unit 18 for controlling the inclination device 17 may be embodied as separate components or they may be integrated into a joint control element 19, which is embodied as a microcontroller, for example. The control units 8, 13, 16, 18 are connected to the components 6, 9, 14, 17 that are to be controlled by communication links 20.

The rotating laser device 1 comprises a measuring unit 21 which detects the angle of rotation of the laser unit 3 and/or of the laser beam 5 during rotation about the axis of rotation 4 and a memory unit 22 for storage of one or more angles of rotation. The measuring unit 21 consists of a master disk 23, which is connected to the shaft 10 in a rotationally fixed manner, a scanning device 24 for scanning the master disk 23 and a control and evaluation unit 25. The control and evaluation unit 25 is integrated into the control element 19 in the embodiment shown in FIG. 1 or, as an alternative, it may be designed as a separate electronic component. The memory unit 22 as an electronic memory unit or as a mechanical memory unit is arranged in the form of reference elements on the master disk 23.

The laser beam 5 emitted from the rotating laser device 1 creates a laser marking on a target surface 26. A laser receiver 27, which is positioned on the target surface 26, is used to visualize the laser marking. The laser receiver 27 can be connected to the rotating laser device 1 by a communication link 28.

The rotating laser device 1 has an operating unit 29, which is integrated into the housing 2 and can be operated from the outside. In addition to the operating unit 29, which is integrated into the housing 2, another operating unit in the form of a remote control unit may be provided, this remote control unit being connectable to the rotating laser device 1 by a communication link. The remote control unit is integrated into the laser receiver 27, for example.

Figure 2:
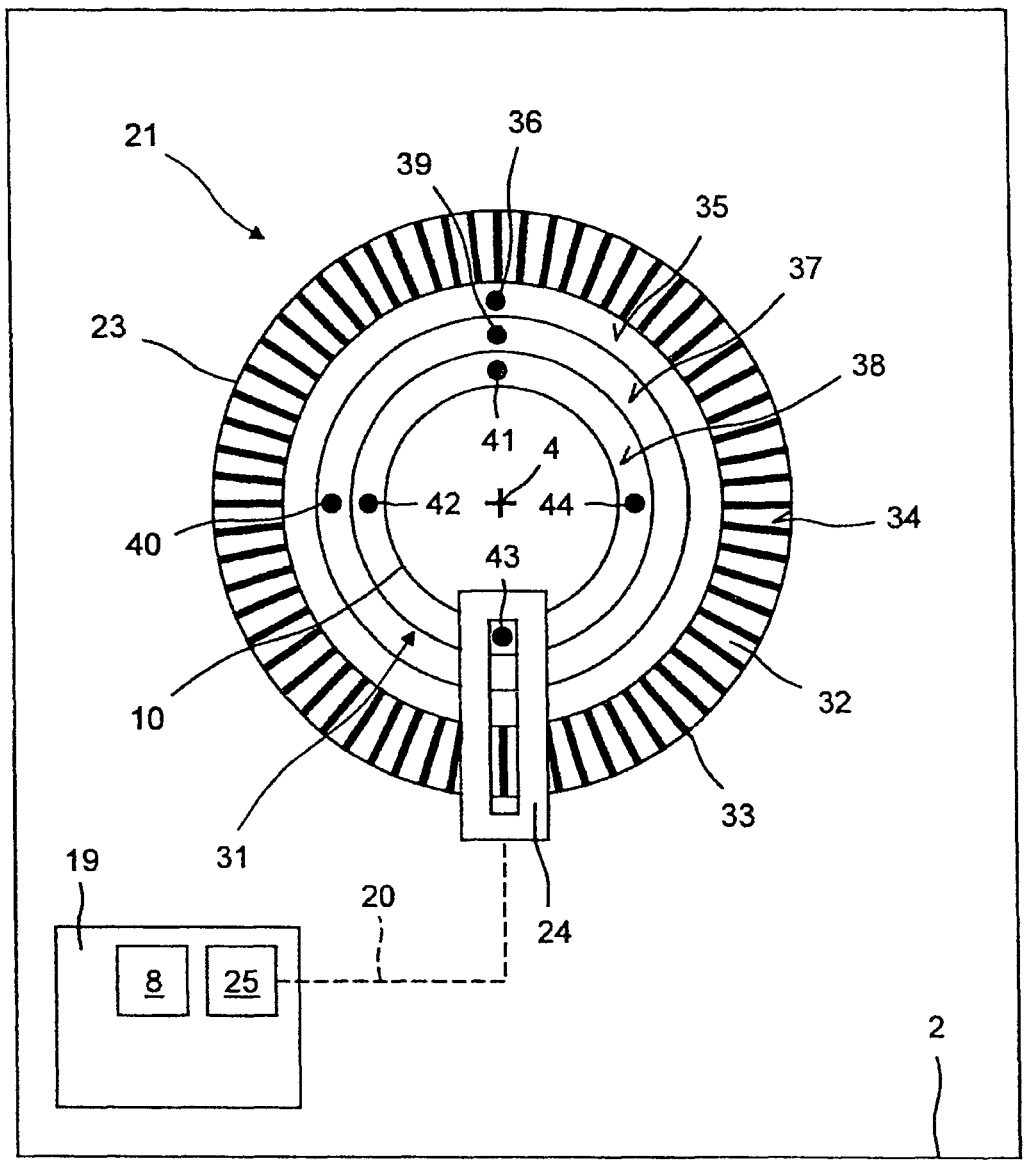
FIG. 2 shows the measuring unit from FIG. 1 and a first embodiment of the memory unit, which is arranged as a mechanical memory unit on a master disk of the measuring device.

FIG. 2 shows the measuring unit 21 for detecting the angle of rotation of the laser unit 3 and/or of the laser beam 5 and a first embodiment of a memory unit for storage of one or more angular positions, this memory unit being designed as a mechanical memory unit 31 on the master disk 23 of the measuring unit 21.

The measuring unit 21 is designed as an incremental rotational sensor and is based on a photoelectric measurement principle. The master disk 23 of the measuring unit 21 has a plurality of segments, which are designed as light strips 32 and dark strips 33 in alternation. The segments 32, 33 are also referred to as increments and form a so-called incremental track 34 on the master disk 23, representing the dimensional embodiment of the rotation sensor. With one complete revolution of the master disk 23, electrical signals are output in a number equal to the number of increments on the master disk 23. The number of increments 32, 33 determines the resolution of the measurement 21, and each increment 32, 33 corresponds to one angle unit of the master disk 23. The resolution of the master disk 23 cannot be altered subsequently.

In addition to the incremental track 34, the master disk 23 has a second track 35 in which a reference element 36 that defines the zero position and is referred to below as the zero element 36 is arranged. The second track is also referred to as a reference track 35. The memory unit 31 is integrated into the master disk 23 and is embodied in the form of reference elements on the master disk 23. The master disk 23 has a third track 37 and a fourth track 38, which together form the mechanical memory unit 31, in addition to the incremental track 34 and the reference track 35.

The third track 37 comprises a first reference element 39, which corresponds to a first angular position $\alpha_1$ of 0°, and a second reference element 40, which corresponds to a second angular position $\alpha_2$ of 90°. The first and second reference elements 39, 40 are utilized to generate a limited laser line with an angle of opening of 90° on the target surface 26 in a linear mode of the rotating laser device 1.

The fourth track 38 comprises another reference element 41, which corresponds to another angular position $\Gamma$. To increase the accuracy of oblique laser markings generated by the rotary laser device 1 on the target surface 26, the angular position, in which the direction of inclination runs parallel to the axis of inclination (X axis) and perpendicular to the Y axis, is stored in the memory unit 31 as a reference element 41. After producing the rotating laser device 1, the device manufacturer determines this angular position $\Gamma$ and stores it in the memory unit 31. The operator utilizes the memory unit 31, which is integrated into the measuring unit 21, and the laser receiver 27 to align the rotating laser device 1 in an alignment mode, so that the direction of inclination runs parallel to the axis of inclination and perpendicular to the Y axis.

In addition to the angular positions shown in FIG. 2, any desired angular position may be arranged on the master disk 23 as a reference element and stored in the mechanical memory unit 31. However the angular positions which are to be stored as reference elements on the master disk 23 must already be defined in the production of the measuring unit 21. Any subsequent change in and/or storage of additional angular positions is no longer possible. The memory unit 31 is therefore suitable for angular positions which are needed for use frequently, in particular. These include the angular positions of 90° and 180°, for example.

Figure 3:
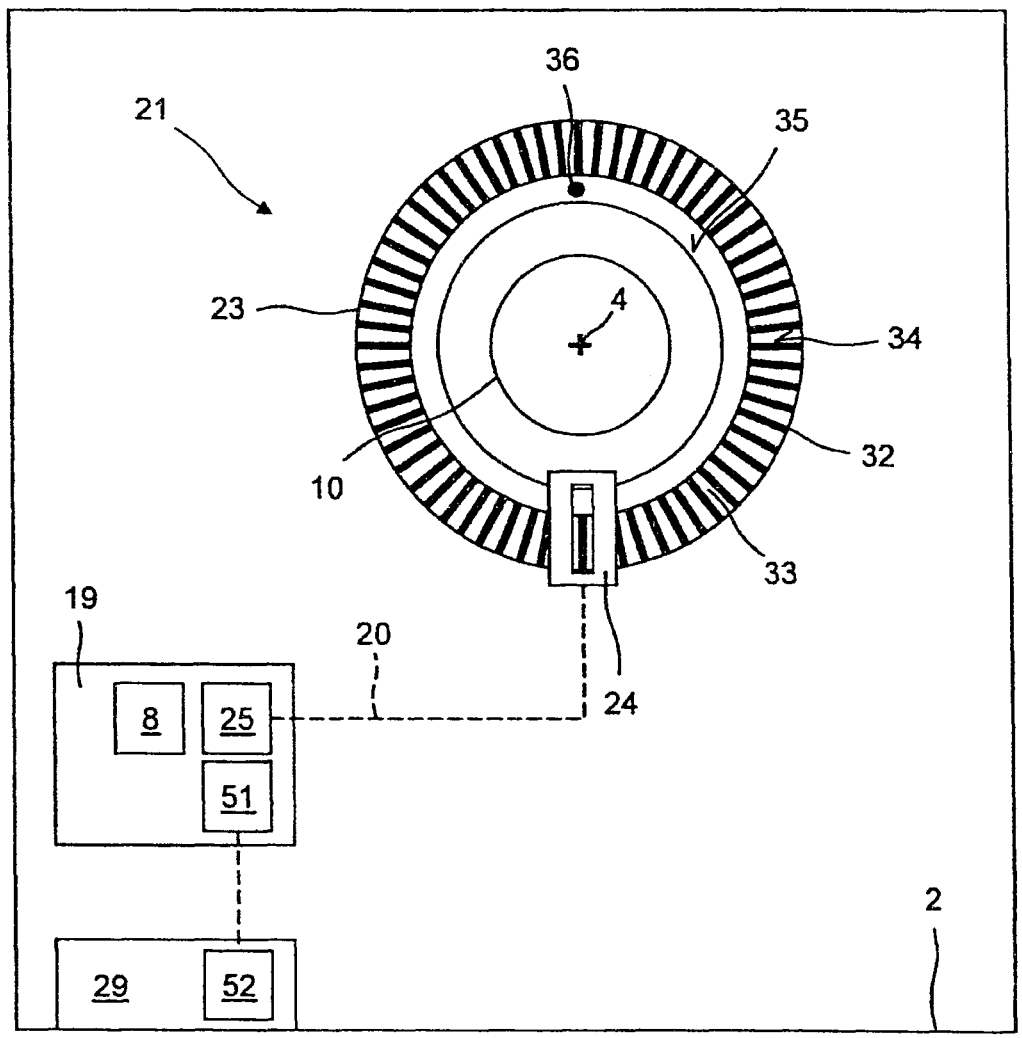
FIG. 3 shows the measuring device of FIG. 1 and a second embodiment of the memory unit which is embodied as an electronic memory unit.

FIG. 3 shows the measuring unit 21 for detecting the angle of rotation and a second embodiment of a memory unit 51 which is designed as an electronic memory unit. To transfer any angles from a target surface 26 to another target surface 26 or to create laser lines with any desired opening angle, the electronic memory unit 51 is especially suitable.

The memory unit 51 is connected to the control and evaluation unit 25 of the measuring unit 21 or alternatively it may be designed as a shared electronic component with the control and evaluation unit 25. The angular positions which are stored in the memory unit 51 and are utilized to control the beam properties of the laser beam 5, for example, are stored permanently as fixed values in the memory unit 51 or they are input by the operator by an input device 52 and are stored in the memory unit 51 only temporarily. The input device 52 is integrated into the operating unit 29 of the rotating laser device 1, for example, or into the laser receiver 27.

Figure 4A:
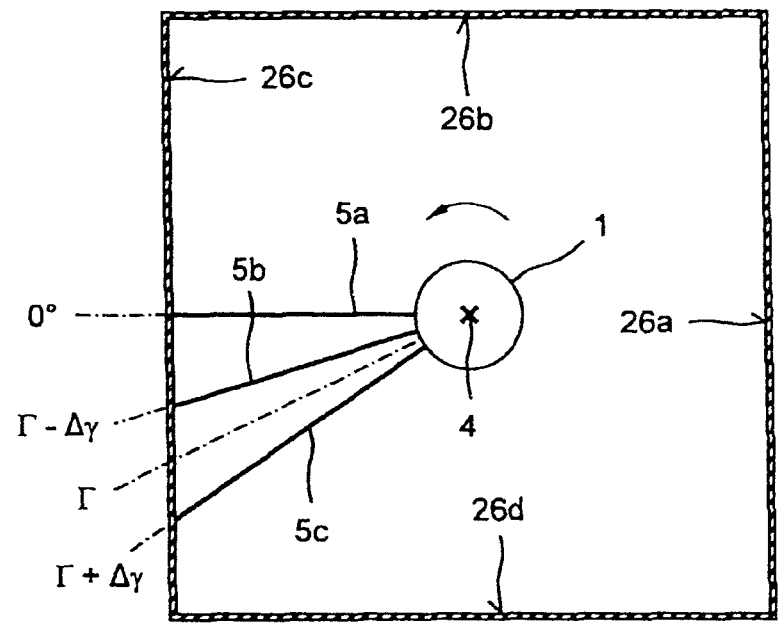
FIGS. 4A, B show an arrangement consisting of the rotating laser device from FIG. 1 and a laser receiver for manual alignment of the rotating laser device (FIG. 4A) and the interaction of the rotating laser device and the laser receiver in the form of a block diagram (FIG. 4B)

FIG. 4A shows an arrangement consisting of the rotating laser device 1 and the laser receiver 27 for aligning the rotating laser device 1 with the help of the measuring unit 21 and the memory unit 31. The angular position $\Gamma$ is stored as a reference element 41 in the memory unit 31. The operator is supported by the rotating laser device 1 and the laser receiver 27 in alignment of the rotating laser device 1. The angular position $\Gamma$ is displayed visually for the operator by various laser beams 5a, 5b, 5c.

The angles of rotation from 0° to 360° are subdivided into three angular ranges, a first angular range between 0 and $\Gamma-\Delta_Y$, a second angular range between $\Gamma-\Delta_Y$ and $\Gamma+\Delta_Y$ and a third angular range between $\Gamma+\Delta_Y$ and 360°. The $\Delta_Y$ corresponds first to the precision with which the laser power of the beam source 6 can be switched and is also defined so that the laser marking between $\Gamma-\Delta_Y$ and $\Gamma+\Delta_Y$ is readily visible for the operator.

Figure 4B:
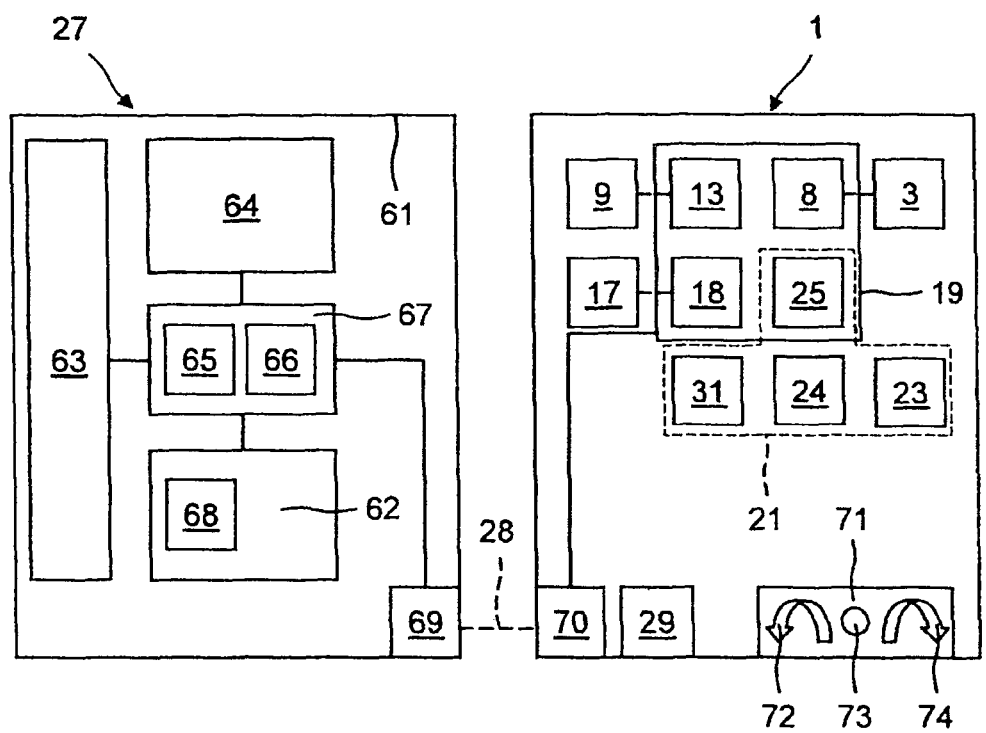

FIG. 4B shows the essential components of the laser receiver 27 and the interaction of the laser receiver 27 with the rotating laser device 1 in the form of a block diagram.

The laser receiver 27 comprises a housing 61, into which an operating unit 62, a detector device 63 for detecting the laser beam 5 and a display unit 64 are integrated. The detector device 63 and the display unit 64 are connected to an evaluation unit 65. The evaluation unit 65 is in turn connected to a control unit 66 for controlling the laser receiver 27, such that the control and evaluation units 65, 66 are integrated into a control element 67, which is embodied as a microcontroller, for example. The laser receiver 27 is switchable by a mode switch 68 between different operating modes. In a first operating mode the laser receiver 27 serves to align the rotating laser device 1, in a second operating mode it serves to provide the optical and/or acoustic display of the laser beam 5 and in a third operating mode it serves to allow remote control of the rotating laser device 1.

The communication between the laser receiver 27 and the rotating laser device 1 takes place by the communication link 28, which connects a first transmission/reception unit 69 in the laser receiver 27 to a second transmission/reception unit 70 in the rotating laser device 1.

The rotating laser device 1 has, in addition to the components described in conjunction with FIG. 1, a display unit 71, on which adjustment instructions are displayed for the operator. The display unit 71 comprises a first display element 72 which is embodied in the form of a left arrow, a second display element 73 which is embodied in the form of a circle and a third display element 74 which is embodied in the form of a right arrow.

An illuminated left arrow 72 signals to the operator that the rotating laser device 1 must be rotated in the left direction. When the correction value $\Gamma \pm \Delta_Y$ is reached, the circle 73 lights up and signals to the operator that the alignment of the rotating laser device 1 has been successfully terminated. An illuminated right arrow 74 signals to the operator that the rotating laser device 1 must be rotated into the right direction.

Figure 5A:
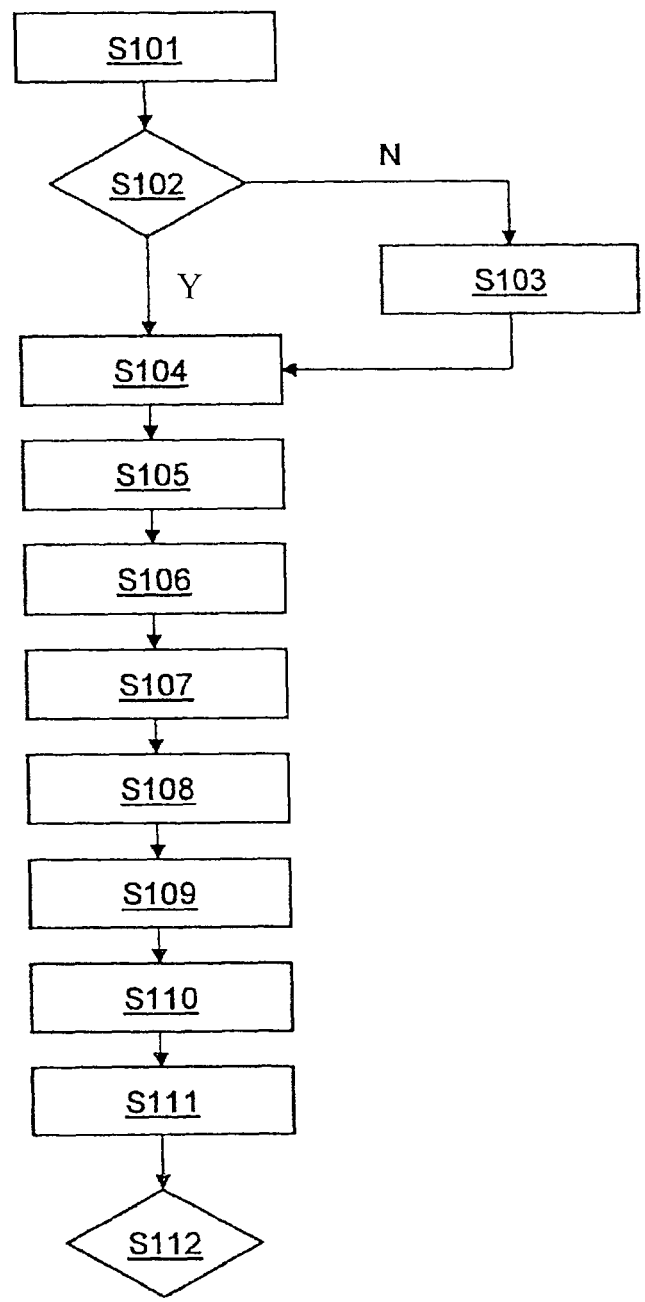
FIGS. 5A, B show a method according to the invention for manually aligning a rotating laser device with the help of the rotating laser device and the laser receiver according to FIGS. 4A, B.

FIGS. 5A, B show a method according to the invention for manual alignment of the rotating laser device 1 by the operator with the help of the measuring device 21 as well as the laser receiver 27 on the basis of a flow chart.

In a step S101, the operator positions the laser receiver 27 in the direction of the axis of inclination and activates the alignment mode by the operating device 62 of the laser receiver 27. In one step S102, a check is performed on whether the communication link 28 between the laser receiver 27 and the rotating laser device 1 has been activated. If the communication link 28 has not been activated (N "no" in S102), the communication link 28 is activated in a step S103. If the communication link 28 between the laser receiver 27 and the rotating laser device 1 has already been activated (Y "yes" in S102), the method is continued with step S104.

In step S104, the operator enters the angle of inclination of the laser plane by using the operating unit 29 of the rotating laser device 1 or the operating unit 62 of the laser receiver 27. The angle of inclination is transmitted in a step S105 from the laser receiver 27 to the control unit 18 of the inclination device 17 by the communication link 28. The control unit 18 issues a corresponding control command in a step S106 to the inclination device 17, which inclines the shaft 10 by the desired angle of inclination in a step S107. In a step S108, the control unit 18 transmits to the laser receiver 27 the information that the inclination has been set.

In a step S109, the control unit 66 of the laser receiver 27 transmits a control command to the beam source 6 and the rotational unit 9 to generate a continuous laser marking on the target surface 26. The laser beam emitted by the beam source 6 is modulated in a step S110 by the control unit 8 as a function of the stored angle position $\Gamma$ and the instantaneous angle of rotation of the rotational unit 9 with three different modulation frequencies so that the three laser beams 5a, 5b, 5c with different optical frequencies are the result. For angles of rotation between 0° and $\Gamma-\Delta_Y$, the laser beam 5 is modulated at a first modulation frequency $F_1$, in the range between $\Gamma-\Delta_Y$ and $\Gamma+\Delta_Y$, the laser beam is modulated at a second modulation frequency $F_2$, and in the interval $\Gamma+\Delta_Y$ to 360°, it is modulated at a third modulation frequency $F_3$.

In a step S111 detector unit 63 of the laser receiver 27 detects the laser beam, determines the optical frequency of the laser beams tracking the detector unit 63 and transmits the optical frequency to the control unit 66. In a step S112, the control unit 66 determines the optical frequency of the laser beam striking it and compares this with a modulation frequency with which the laser beam was modulated.

Figure 5B:
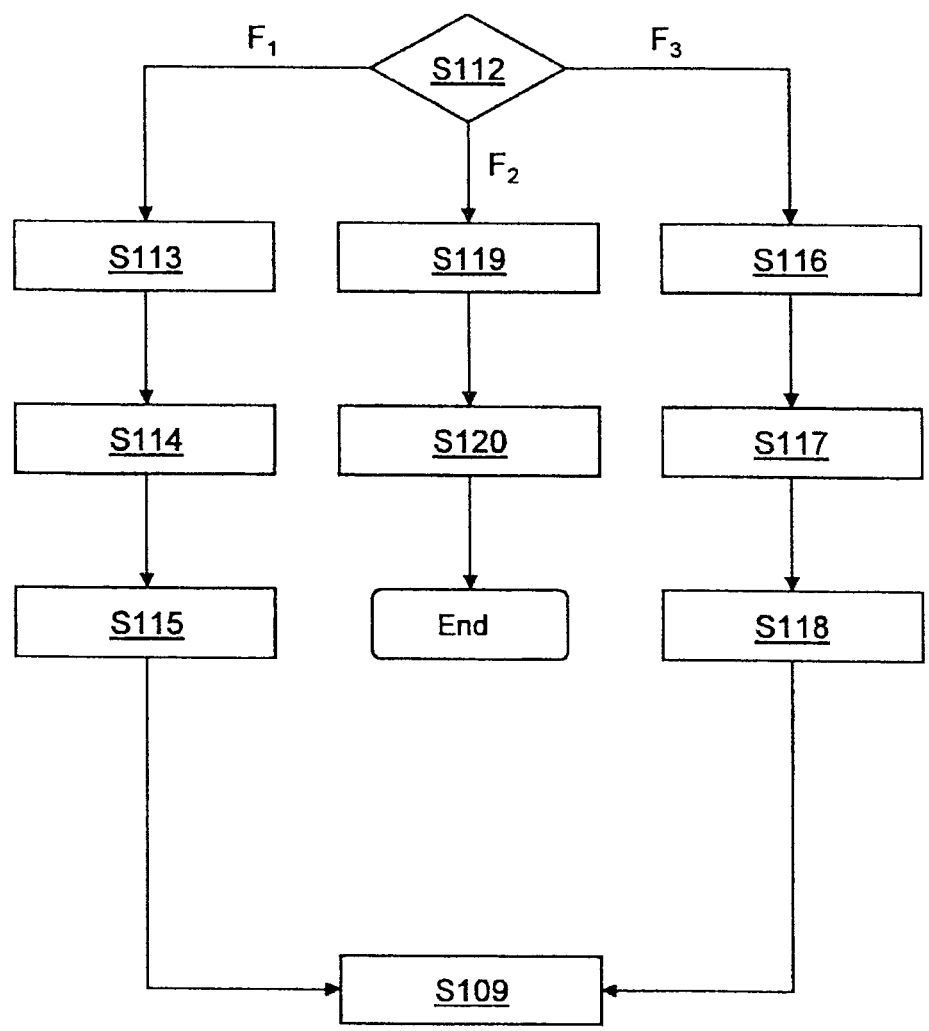

FIG. 5B shows the remaining method according to step S112 for the various modulation frequencies $F_1$, $F_2$ and $F_3$ with which the laser beam has been modulated as a function of the angle of rotation.

If the laser beam was modulated with the first modulation frequency $F_1$, the control unit transmits a control command in a step S113 to the display unit 71 to activate the right arrow 74. In a step S114, the right arrow 74 is activated. The operator rotates the rotating laser device 1 clockwise according to the optical instructions in a step S115. The method is continued with step S109.

If the laser beam has been modulated at the third modulation frequency $F_3$, the control unit issues a control command in a step S116 to the display unit 71 to activate the left arrow 72. In a step S117 the left arrow 72 is activated. The operator rotates the rotating laser device 1 counterclockwise in accordance with the optical instructions in a step S118. The method is continued with step S109.

If the laser beam has been modulated at the second modulation frequency $F_2$, the control unit issues a control command to the display unit 71 in a step S119 to activate the circle 73. In a step S120 the circle 73 is activated. The method for aligning the rotating laser device 1 is terminated after step S120.

Figure 6:
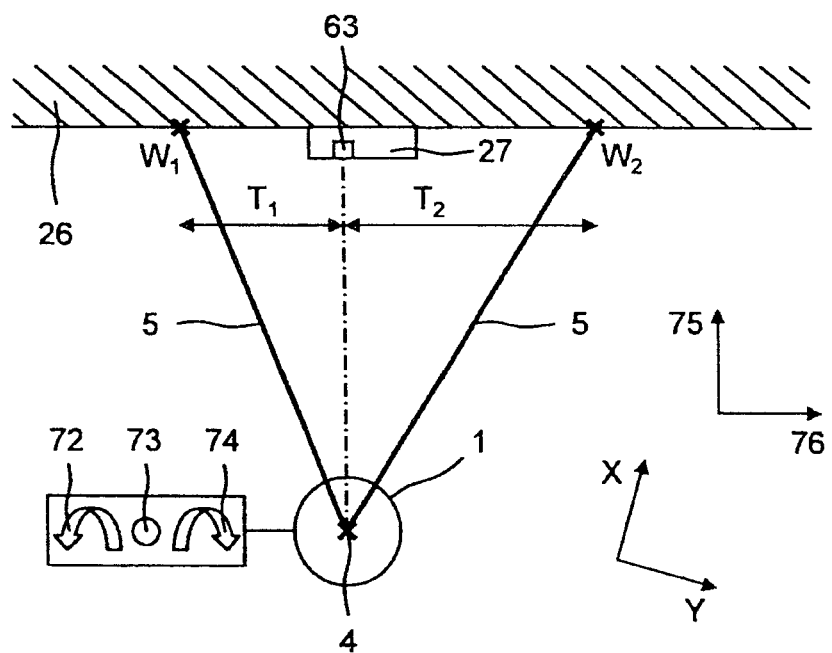
FIG. 6 shows an alternative arrangement and an alternative method for manual alignment of a rotating laser device.

FIG. 6 shows an alternative method for manual alignment of the rotating laser device 1 with the help of the measuring unit 21 and the laser receiver 27. The rotating laser device 1 is operated in a scan mode. In the scan mode, the laser beam 5 is moved back and forth in limited angle range between a first turning point $W_1$ and a second turning point $W_2$. The laser beam 5 generates a limited laser line on the target surface 26.

The goal is to align the rotating laser device 1, so that the angular position $\Gamma$ in which the direction of inclination 75, which is predetermined by the measurement task, is aligned parallel to the axis of inclination X and perpendicular to the Y axis, so that it is arranged at the midpoint of the detector unit 63. The laser receiver 27 is positioned on the target surface 26 in such a way that the straight line passes through the midpoint of the detector unit 63 and through the axis of rotation 4 parallel to the direction of inclination 75. The horizontal direction 76 is perpendicular to the direction of inclination 75.

The rotating laser device 1 creates a limited laser line between the turning points $W_1$, $W_2$ in response to a control command of the laser receiver 27. The laser receiver 27 determines a time $T_1$ which is needed by the laser beam 5 to travel the distance from the detector unit 63 to the first turning point $W_1$ and back to the detector unit 63 and a time $T_2$ which is needed by the laser beam 5 to travel the distance from the detector unit 63 to the second turning point $W_2$ and back to the detector unit 63.

The rotating laser device 1 is arranged in the angular position $\Gamma$ when the times $T_1$ and $T_2$ are the same. This is indicated to the operator by the illuminated circle 73. If the time $T_1$ is less than the time $T_2$ as shown in FIG. 6, the left arrow 72 is lighted up, indicating to the operator that the rotating laser device 1 must be rotated counterclockwise, i.e., in the left direction about the axis of rotation 4. If the time $T_1$ is greater than the time $T_2$, the rotating laser device 1 must be rotated clockwise, i.e., in the right direction about the axis of rotation 4. These adjustment instructions are displayed for the operator by the illuminated right arrow 74.

Figure 7:
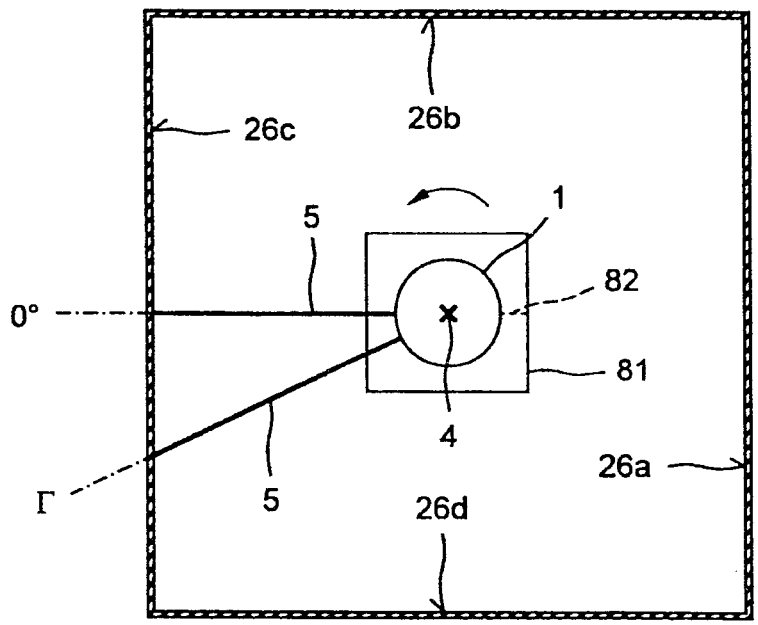
FIG. 7 shows an arrangement for automatic alignment of a rotating laser device with an automatic adjusting device.

FIG. 7 shows an alternative variant to the alignment of the rotating laser device 1 by an automatic adjusting device 81. This variant of the method has the advantage over the manual method shown in FIGS. 5A, B that the effort for the operator is minimal. The operator need only wait until the method for aligning the rotating laser device 1 is concluded.

FIG. 7 shows a variant in which the rotating laser device is arranged on the adjusting device 81 and is rotated about the axis of rotation 4. Alternatively, the adjusting device 81 may be provided in the housing 2 of the rotating laser device 1. In this case the, shaft 10 and the components connected to the shaft 10 in a rotationally fixed manner are rotated about the axis of rotation 4 in relation to the housing 2.

The rotating laser device 1 is connected to the adjusting device 81 by a communication link 82. In the alignment mode, the angular position Γ stored in the memory unit is transmitted to the adjusting device 81 by the communication link 82. The adjusting device 81 rotates the rotating laser device 1 into the angular position Γ, in which the direction of inclination is aligned parallel with the axis of inclination (X axis) and perpendicular to the Y axis.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotating laser device, comprising:
   a laser unit, wherein a laser beam is generatable by the laser unit;
   a leveling device, wherein a laser beam is alignable by the leveling device in a horizontal plane which is arranged perpendicular to a gravitational field of earth and which is spanned by an X axis and a perpendicularly aligned Y axis;
   an inclination device, wherein a laser beam is inclinable by the inclination device about an axis of inclination in relation to the horizontal plane, wherein a laser plane generated by the laser beam is inclined in a direction of the X axis and is aligned horizontally in a direction of the Y axis;
   a rotational unit, wherein the laser unit is movable by the rotational unit about an axis of rotation at a rotational speed;
   a measuring unit, wherein an angle of rotation of the laser unit about the axis of rotation is determinable by the measuring unit; and
   a memory unit, wherein an angular position of the laser unit in which a direction of inclination is aligned parallel to the X axis and perpendicular to the Y axis is storable in the memory unit.

2. The rotating laser device according to claim 1, further comprising a control unit, wherein a beam property of the laser beam is adjustable as a function of the angle of rotation by the control unit.

3. The rotating laser device according to claim 1, wherein the memory unit is a mechanical memory unit that includes a reference element on a master disk of the measuring unit.

4. The rotating laser device according to claim 1, wherein the memory unit is an electronic memory unit.

5. The rotating laser device according to claim 4, further comprising an input device and wherein the memory unit is connected to the input device.

6. The rotating laser device according to claim 1 in combination with an automatic adjusting device, wherein the rotating laser device is adjustable by the automatic adjusting device about the axis of rotation.

7. The rotating laser device according to claim 1, further comprising a display unit having a first display element and a second display element.

8. The rotating laser device according to claim 1 in combination with a laser receiver, wherein the laser receiver is connectable to the rotating laser device by a communication link and wherein a beam property of a laser beam and/or an interval of time of a laser beam is determinable by the laser receiver.

9. A method for aligning a rotating laser device, comprising the steps of:
   inclining a laser beam by an inclination device about an axis of inclination relative to a horizontal plane which is arranged perpendicular to a gravitational field of earth and which is spanned by an X axis and a perpendicularly aligned Y axis, wherein the axis of inclination is parallel to the X axis;
   rotating the rotating laser device about an axis of rotation into an angular position in which a direction of inclination is aligned parallel to the X axis and perpendicular to the Y axis; and
   storing the angular position, in which the direction of inclination is aligned parallel to the X axis and perpendicular to the Y axis, in a memory unit.

10. The method according to claim 9, further comprising the steps of:
    moving the laser beam at a rotational speed about the axis of rotation;
    detecting an angle of rotation of the laser beam about the axis of rotation by a measuring unit; and
    adjusting a beam property of the laser beam as a function of the angle of rotation.

11. The method according to claim 9, further comprising the step of moving the laser unit back and forth between a first turning point and a second turning point about the axis of rotation.

12. The method according to claim 9, further comprising the steps of:
    detecting the laser beam by a laser receiver; and
    determining a beam property of the laser beam and/or an interval of time of the laser beam by the laser receiver.

13. The method according to claim 9, further comprising the steps of:
    transmitting the stored angular position to an automatic adjustment device; and
    rotating the rotating laser device about the axis of rotation into the stored angular position by the adjustment device.

14. A method for aligning a rotating laser device, comprising the steps of:
    inclining a laser beam by an inclination device about an axis of inclination relative to a horizontal plane which is arranged perpendicular to a gravitational field of earth;
    rotating the rotating laser device about an axis of rotation into an angular position in which the axis of inclination is aligned parallel to a predetermined direction of inclination;
    storing the angular position, in which the axis of inclination is aligned parallel to the predetermined direction of inclination, in a memory unit;
    moving the laser beam at a rotational speed about the axis of rotation;

detecting an angle of rotation of the laser beam about the axis of rotation by a measuring unit;

adjusting a beam property of the laser beam as a function of the angle of rotation;

varying a beam property of the laser beam from a first value to a second value on reaching the angular position; and varying the beam property from the second value to the first value on reaching a zero position.

15. A method for aligning a rotating laser device, comprising the steps of:

inclining a laser beam by an inclination device about an axis of inclination relative to a horizontal plane which is arranged perpendicular to a gravitational field of earth;

rotating the rotating laser device about an axis of rotation into an angular position in which the axis of inclination is aligned parallel to a predetermined direction of inclination;

storing the angular position, in which the axis of inclination is aligned parallel to the predetermined direction of inclination, in a memory unit;

moving the laser beam at a rotational speed about the axis of rotation;

detecting an angle of rotation of the laser beam about the axis of rotation by a measuring unit;

adjusting a beam property of the laser beam as a function of the angle of rotation;

calculating a first angle of rotation and a second angle of rotation from the stored angular position; and controlling the beam property of the laser beam as a function of the angle of rotation of the laser unit such that the beam property is varied from the first value to the second value on reaching a first angle of rotation, is varied from the second value to a third value on reaching a second angle of rotation, and is varied from the third value to the first value on reaching the zero position.

16. A method for aligning a rotating laser device, comprising the steps of:

inclining a laser beam by an inclination device about an axis of inclination relative to a horizontal plane which is arranged perpendicular to a gravitational field of earth;

rotating the rotating laser device about an axis of rotation into an angular position in which the axis of inclination is aligned parallel to a predetermined direction of inclination;

storing the angular position, in which the axis of inclination is aligned parallel to the predetermined direction of inclination, in a memory unit;

detecting the laser beam by a laser receiver;

determining a beam property of the laser beam and/or an interval of time of the laser beam by the laser receiver;

determining adjustment instructions for an operator from the beam property of the laser beam and/or from the interval of time; and displaying the adjustment instructions on a display unit.

* * * * *